July 14, 1953 — A. BLESSING ET AL — 2,645,371
CHARGING AND DISCHARGING DEVICE FOR REFUSE TRUCKS
Filed Oct. 3, 1949 — 3 Sheets-Sheet 1
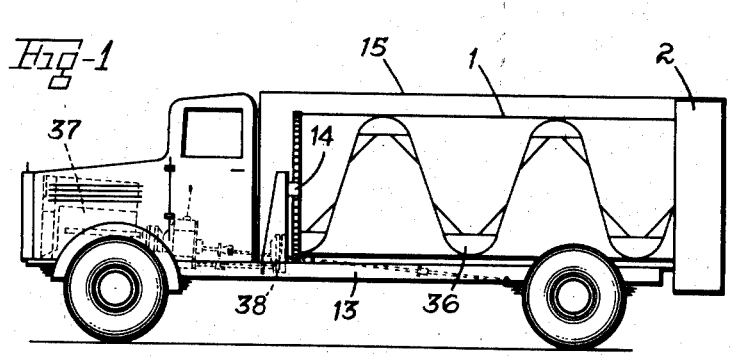
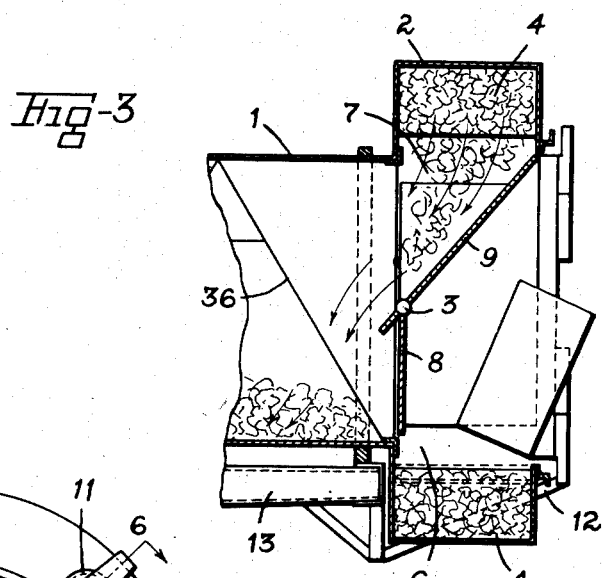
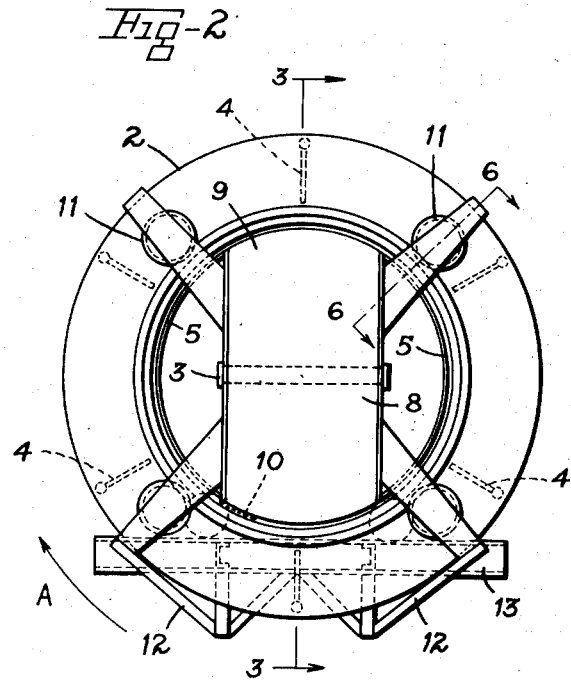
INVENTORS
ALBERT BLESSING,
GEORG STAUDENMEIER,
HANS TILCH & FRITZ KAISER
BY Mareschal & Biebel
ATTORNEYS July 14, 1953 — A. BLESSING ET AL — 2,645,371
CHARGING AND DISCHARGING DEVICE FOR REFUSE TRUCKS
Filed Oct. 3, 1949 — 3 Sheets-Sheet 2
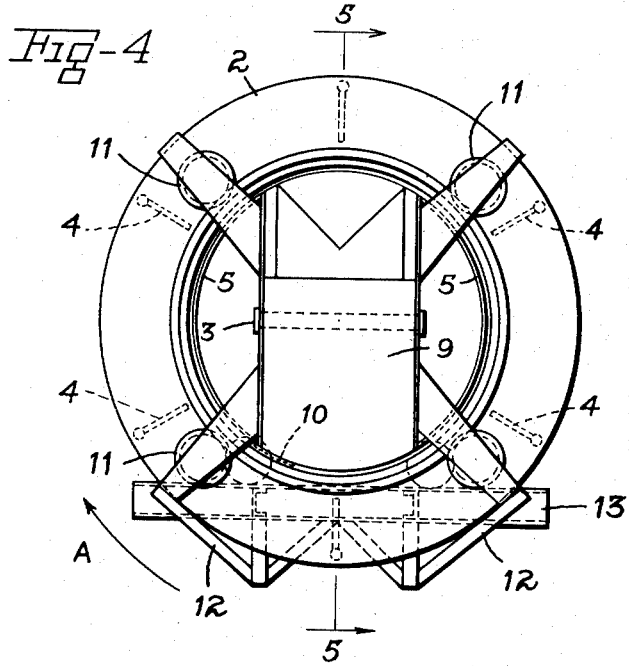
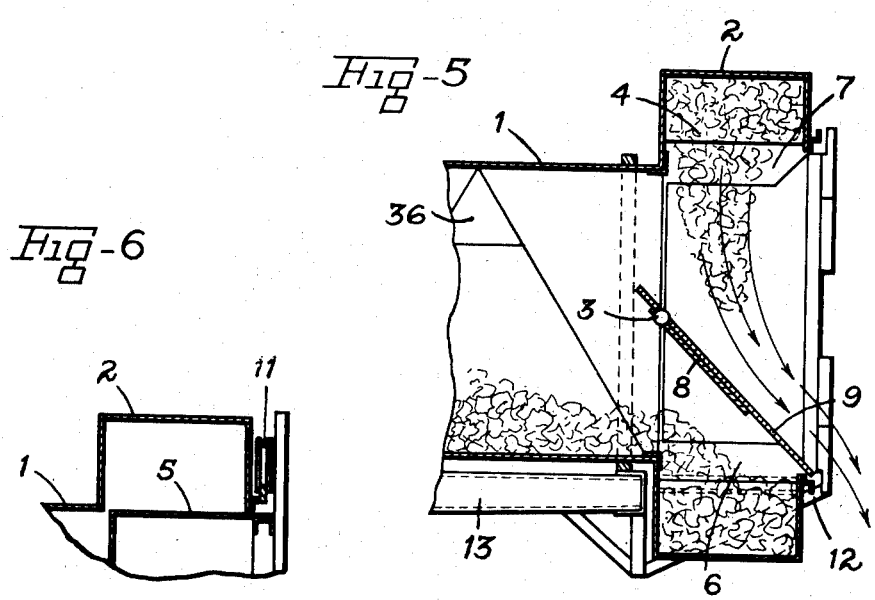
INVENTORS
ALBERT BLESSING,
GEORG STAUDENMEIER,
HANS TILCH & FRITZ KAISER
BY Marechal & Biebel
ATTORNEYS

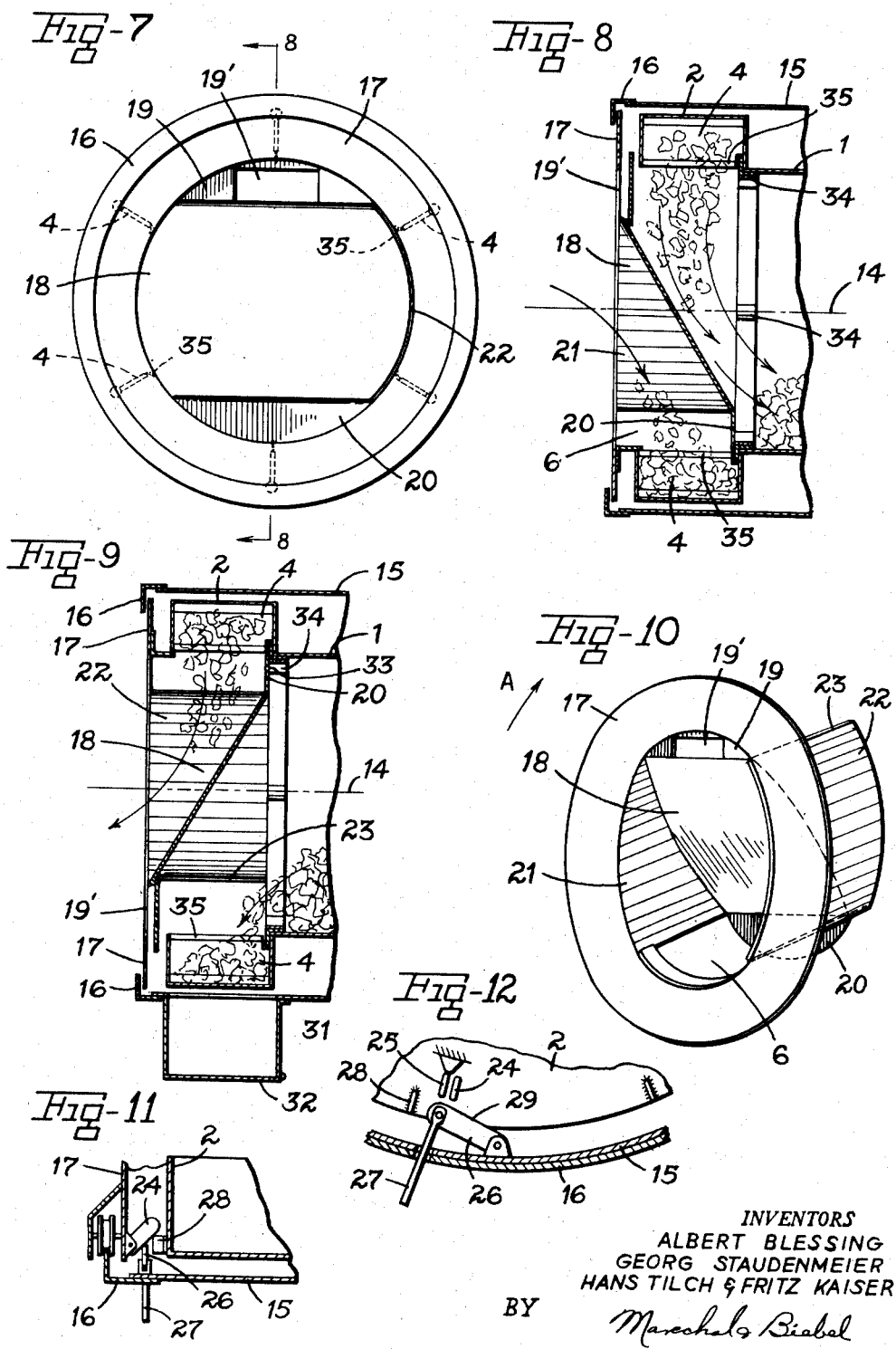

Patented July 14, 1953

2,645,371

UNITED STATES PATENT OFFICE 2,645,371

CHARGING AND DISCHARGING DEVICE FOR REFUSE TRUCKS

Albert Blessing, Georg Staudenmeier, Hans Tilch, and Fritz Kaiser, Augsburg, Germany, assignors to Keller and Knappich G. m. b. H. Maschinenfabrik, Augsburg, Germany, a corporation of Germany Application October 3, 1949, Serial No. 119,276
In Germany October 6, 1948

12 Claims. (Cl. 214—507)

1

This invention relates to a device for the loading and unloading of cars for loose material, and more particularly, dust carts, of the type having a rotary drum-shaped bin or tank and a blade wheel rotating therewith.

In a known arrangement of this kind the blade wheel has two receivers which partly are covered towards the interior of the blade wheel by blade walls and towards the interior of the bin or container have flaps which are held in a closed position by springs and are opened in the top position by cam-controlled arms. The discharge of these receivers is unsatisfactory, since only the least part of the dust is permitted to fall out freely through the lateral openings, the more so as it has a rather steep natural slope. The control of the flaps is complicated, springs are unsafe in operation. The receivers can be charged only partly, since no means are provided for covering their opening; a discharge through the blade wheel is not possible, the more so as it is covered outwards by a narrow diaphragm aperture. Therefore, this proposal has never gained any importance in practice.

It is the object of the present invention to provide means by which these disadvantages can be avoided.

According to the invention a fixed trough or chute is arranged within the blade wheel, through which the loose material falling out of the blade wheel slips into the bin as the cart is loaded. Moreover, the chute according to the invention is swingable in such a way that the loose material when unloading the cart slips through it to the outside. To this end, according to one embodiment of the invention the wall covering the interior of the bin underneath the chute is detachable, more particularly, outwardly swingable. By said means a quick loading and unloading of the bin through the blade wheel is absolutely ensured in a very simple manner. To this end, moreover, the blade wheel is advantageously perfectly open at its inner side, bearing only single radial drivers, whose mutual distance permits the reception of large pieces contained in the loose material. This permits the filling without any restraint of the whole space available in the blade wheel and also an easy and safe discharge. To this end, according to a further feature of the invention the blade wheel is covered at its open side at least in its conveying direction by a fixed insert. Thus, simultaneously a very small packing length between the rotary and the fixed part results and thereby a considerable reduction of the wear and tear and savings in packing

2 collars compared to the conventional inserts and packing arrangements. For, in the device according to the invention the inner edges of the fixed insert need not afford a tight closing in relation to the blade wheel, since the material trickling through at this point falls back into the blade wheel and thus is conveyed back into the tank or bin.

The inner diameter of the blade wheel according to the invention may be smaller than the diameter of the tank, more particularly in such a way that the blade wheel fits into the tank. It is particularly favorable for the emptying, however, if the inner diameter of the blade wheel is equal to, or larger than, the diameter of the tank. This also permits a reduction of the charging height. Since the invention permits discharging of the cart without opening a large and heavy closing cover and without the use of a special mechanism, special devices for the dust free charging of the material are advantageously provided in a swingable arrangement.

The device in accordance with the invention does not depend on a special design of the drum. Special advantages are attained, however, in connection with a container or tank with single thread conveyer surfaces and with conveyer surfaces whose conveying direction during the loading is opposed to the direction of rotation. In the first case my novel system will considerably accelerate the loading speed in general and in the second case it will accelerate the same primarily in the period up to the filling of the container drum to half the total height, where, as is well known, the material accumulates at the charging side of the container, which, however, will not disturb any longer where the invention is applied and will not be noticeable at all from the outside. This conveying method has the great advantage that the container drum can be filled fully without ever requiring a change of the direction of rotation—not even for unloading—nor the provision of a reversing gear. So far, owing to the unfavorable reaction of the accumulation of the dust at the charging and during the first half period of the filling operation this conveying method was not practicable. This drawback is removed by the present invention.

According to a further feature of the invention the chute can be swung about the axis of rotation of the drum. This results in a particularly simple design and operation in swinging it, since the chute can now be swung from the charging to the discharging position and vice versa together with the drum which is rotating anyway.

To this end the chute in accordance with the invention is arranged in a circular cover which is mounted for rotation concentrically to the axis of rotation of the dum. The cover in this case is adapted to be released from its fixed support, e. g., at the chassis frame or at the fixed casing of the drum, and to be locked with the drum, or with the blade wheel. This operation thus can easily be carried out from the driver's seat; for the swinging itself the rotary drum is available as a drive. The release and locking can be effected by a single manipulation, if it is achieved in accordance with the invention by adjusting a single stop member swingably mounted at the cover, through which the connection with a fixed abutment or with a rotary stop is achieved.

It is also contemplated within the purview of the invention to connect the chute with the cover to a constructional unit. Advantageously, however, it can be released from the cover so that the drum can be entered through its opening, without requiring removal of the cover proper, which would require heavy hinge joints. Moreover, this offers the advantage that the chute, which is liable to wear and tear, can be easily replaced.

According to a further feature of the invention the outside part of the cover is formed with openings which advantageously are provided with flaps to be opened outwards. In the loading position these openings are disposed above the chute and permit inspection of the interior of the drum; the dust produced there is prevented from escaping by the flaps.

A further improvement consists in that the chute extends inwards over the whole inner width of the blade wheel. Thus, first of all, the discharging operation is accelerated, since the loose material, which is always also lifted a bit by the rotation of the drum, will not strike against any vertical walls whatever of the cover, but is permitted to fall unchecked into the blade wheel. However, in order that no pieces possibly contained in the loose material may be jammed as the connecting channel between the interior of the drum and the blade wheel spaces is gradually narrowing, the chute according to a further feature of the invention bears at its inner side in the conveying direction for the discharge a covering sheet with a stripping edge for the blade wheel. The covering sheet simultaneously serves to prevent the loose material which may have been conveyed to the inner side of the chute, from getting to the outside thereof in the charging operation. Furthermore, strippers will sweep past the part of the cover which is on the upper side during the discharge, so as to prevent the loose material from accumulating there and impeding the discharge.

Underneath the gap between the cover and the blade wheel there is provided a collecting receptacle with an opening which is capable of being closed and adapted to receive at least the clearance losses of one drum charge. In this manner, all special packing means can be dispensed with, which will afford considerable savings in such means.

Other and further objects, features and advantages of the invention will be pointed out hereinafter and appear in the appended claims forming part of the application.

In the accompanying drawings several now preferred embodiments of the invention are shown by way of illustration and not by way of limitation.

In the drawings:

Fig. 1 is a general view of the dust cart,

Fig. 2 is an end view of one embodiment of the invention, in the loading or charging position, Fig. 3 is an axial section thereof;

Fig. 4 is a view similar to Fig. 2, but showing the unloading or discharging position, Fig. 5 is a section similar to Fig. 3, but showing the unloading or discharging position, Fig. 6 is a detail of this arrangement, also shown in an axial section, on line 6—6 in Fig. 2, Fig. 7 is an end view from outside, Fig. 8 is an axial section of another modification, in the loading position, Fig. 9 is an axial section of the same modification, in the unloading position, Fig. 10 is a perspective view showing the circular cover with the chute, Fig. 11 is a side view showing a detail, Fig. 12 is an end view showing the same detail.

Similar reference numerals denote similar parts in the different views.

Referring now to the drawings in greater detail and first to Fig. 1, it will be seen that the drum-shaped container or tank 1 bears at its charging end a blade wheel 2 and in its interior conveying guide plates or sheets 36. It is rotated from the driving motor 37 of the cart, through a gear 38, in a direction of rotation which is opposed to the conveying direction of the conveyer guide sheets 36 during the charging, and which is maintained also for the unloading operation. The inside of the blade wheel 2 provided with the blades 4 is open and covered to the right and to the left by a fixedly mounted cylindrical insert 5 having the width of the blade wheel 2. This insertion leaves open a lower opening 6 and an upper opening 7; it is provided with a wall 8 delimiting the interior of the container 1, and a chute 9 on which the dust in the loading position slips into the interior of the container. For the unloading operation the chute 9 and the wall 8 are hinged about their axis 3, so that the dust now falls from the container 1 into the opening 6 of the insert 5 and so into the blade wheel 2, from which it is conveyed on to the chute 9 and through the same slips outwards.

The edge 10 of the fixed insertion 5 lying in the conveying direction projects at the charging opening 6 into the interior of the blade wheel 2 and the blades 4 are recessed accordingly. Thus a constriction is formed in the path of conveyance of the blade wheel, whereby solid pieces contained in the loose material which just pass through this constriction, will cause jamming at this point only. If desired, this edge, or these blades, may be made springing.

The insert 5 is supported at the blade wheel 2 through rollers 11, the holder 12 being held against turning at the chassis 13.

In the modification shown in Figs. 7 to 12, the drum 1 mounted for rotation about the axis 14 is surrounded by a casing 15 fixed on the chassis 13 and bearing at its end a ring 16. Mounted for rotation in this ring 16 is a circular cover 17 carrying the chute 18 which is detachably secured to it and extends over the breadth and the whole inner width of the blade wheel 2. Only above and underneath the same are provided small end surfaces 19 and 20, the surface 19 having openings 19'. To the outside the blade wheel 2 is covered by cylindrical surface parts 21 in the cover which are interrupted by the discharge opening 6. Inside, merely in the discharge conveying direction (the charging and discharging takes place with rotation in the same direction of rotation of the arrow A) a covering sheet 22 with stripping-off edge 23 is provided which leaves the inner surface of the chute 18 clear.

The cover 17 bears a stop member 24 downwardly acted upon by a spring. It engages a fixed abutment 25 if the cover 17 is stopped, and is held in this position by a cam 26 mounted on the fixed part of the structure. When the same is removed through the pull rod 27, the stop member 24 swings downwards under action of its spring and comes within reach of the stops 28 secured at the blade wheel 2 by which it is taken along, so that the cover 17 swings about the drum axis 14. When the cover is turned by 180°, a second corresponding member 24 bears against the fixed abutment 25 after having been moved out of the zone of engagement with the stops 28 of the blade wheel 2, by the inclined surface 29 of the cam 26.

Underneath the gap 30 between the blade wheel 2 and the cover 17 there is arranged a collecting tank or receptacle 31 for the clearance losses, whose bottom 32 can be opened for discharging it.

Strippers 34 mounted at the drum 1 brush along the inner edge 33 of the cover part 20 which is in the top position during the discharge, preventing the collection and accumulation of dust material at this edge 33 during the discharge.

The blades 4 bear interchangeable, resilient wearing edges 35 of rubber which slide on the cylindrical surface parts 21 so as to prevent the dust from escaping.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described our invention, we claim as new and desire to secure by Letters Patent:

1. In a device for the charging and discharging of vehicles for loose material having a rotary, drum-shaped container, in combination, a blade wheel adapted to rotate with said container, a circular cover mounted on the stationary part of the vehicle concentrically to, and for swinging about, the axis of rotation of the drum, a chute fixedly mounted in said cover so as to be disposed within the blade wheel, means for locking said cover at the stationary part of the vehicle, and means for releasing said locking means and for locking said cover with the rotary drum and blade wheel unit, said chute serving for the charging and discharging of the drum in two different positions adjustable by swinging said cover about the axis of rotation of the drum.

2. In a device for the charging and discharging of vehicles for loose material having a rotary, drum-shaped container, in combination, a blade wheel adapted to rotate with said container, a circular cover mounted on the stationary part of the vehicle concentrically to, and for swinging about, the axis of rotation of the drum, a chute fixedly mounted in said cover so as to be disposed within the blade wheel, an adjustable stop member movably mounted at the cover, a stationary abutment adapted for engagement with said adjustable stop member in one position thereof, and a stop member mounted on the rotary drum and blade wheel unit and adapted for engagement with said adjustable stop member in the second position thereof, whereby said cover can be coupled with the stationary part of the vehicle or with the rotary drum and blade wheel unit, by adjustment of said adjustable stop member, said chute serving for the charging and discharging of the drum in two different positions adjustable by swinging said cover about the axis of rotation of the drum.

3. In a device for the charging and discharging of vehicles for loose material having a rotary, drum-shaped container, in combination, a blade wheel adapted to rotate with said container, a circular cover mounted concentrically to the axis of rotation of the drum, a chute mounted in said cover so as to be swingable about the axis of rotation of the drum, within the blade wheel, in such a way that in the charging position of the chute the loose material falling out of the blade wheel during the charging operation slides into the container, while in the discharging position of the chute the loose material slides outwards through the chute, said chute extending inwards over the whole inner width of the blade wheel, and stripping members brushing along that inner edge of the cover which is disposed at the upper side during the discharge.

4. In a device for the charging and discharging of vehicles for loose material having a rotary, drum-shaped container, in combination, a blade wheel adapted to rotate with said container, a circular cover mounted concentrically to the axis of rotation of the drum, a chute mounted on said cover so as to be swingable about the axis of rotation of the drum, within the blade wheel, in such a way that in the charging position of the chute the loose material falling out of the blade wheel during the charging operation slides into the container, while in the discharging position of the chute the loose material slides outwards through the chute, and a collecting receptacle disposed underneath the clearance between the cover and the blade wheel, said receptacle having an opening capable of being closed.

5. In a device for the charging and discharging of vehicles for loose material having a rotary, drum-shaped container, in combination, a blade wheel adapted to rotate with said container, a circular cover mounted concentrically to the axis of rotation of the drum, a chute mounted in said cover so as to be swingable about the axis of rotation of the drum, within the blade wheel, in such a way that in the charging position of the chute the loose material falling out of the blade wheel during the charging operation slides into the container, while in the discharging position of the chute the loose material slides outwards through the chute, and a collecting receptacle disposed underneath the clearance between the cover and the blade wheel, said receptacle having an opening capable of being closed, and a capacity at least sufficient for the clearance losses of one drum charge.

6. Apparatus for loading and unloading vehicles for carrying loose bulk material comprising in combination a drum shaped tank substantially horizontally mounted on said vehicle for containing said material, a plurality of inclined conveying guide plates within said tank for distributing said material through said tank during rotation thereof, said tank having an opening at one end thereof for receiving said material, a blade wheel mounted substantially coaxially with said tank at said open end thereof, means for rotating said tank and said wheel together about the common axis thereof, means in said wheel including radially disposed conveyor blades around the inner periphery of said wheel for receiving loose bulk material at the lower periphery of said wheel and for carrying such material upwardly during rotation of said wheel, an inclined chute adjacent the open end of said tank, means for mounting said chute within said wheel and independently of the rotating movement thereof, and means for adjustable movement of said chute from a first position extending downwardly from the outside of said wheel toward the inside of said tank for guiding into said tank loose bulk material raised to the upper portion of said chute during rotation of said wheel to a second position extending downwardly from the inside of said tank toward the outside of said wheel for guiding out of said tank loose bulk material raised to the upper portion of said chute during rotation of said wheel.

7. Apparatus for loading and unloading vehicles for carrying loose bulk material comprising in combination a drum shaped tank substantially horizontally mounted on said vehicle for containing said material, a plurality of inclined conveying guide plates within said tank for distributing said material through said tank during rotation thereof, said tank having an opening at one end thereof for receiving said material, a blade wheel mounted substantially coaxially with said tank at said open end thereof, means for rotating said tank and said wheel together about the common axis thereof, means in said wheel including radially disposed conveyor blades around the inner periphery of said wheel for receiving loose bulk material at the lower periphery of said wheel and for carrying such material upwardly during rotation of said wheel, an inclined chute within said wheel extending downwardly from outside of said wheel into said tank for guiding downwardly into said tank loose bulk material carried by said wheel, and stationary means for mounting said chute independently of the rotating movement of said wheel.

8. Apparatus for loading and unloading vehicles for carrying loose bulk material comprising in combination a drum shaped tank substantially horizontally mounted on said vehicle for containing said material, a plurality of inclined conveying guide plates within said tank for distributing said material through said tank during rotation thereof, said tank having an opening at one end thereof for receiving said material, a blade wheel mounted substantially coaxially with said tank at said open end thereof, means for rotating said tank and said wheel together about the common axis thereof, means in said wheel including radially disposed conveyor blades around the inner periphery of said wheel for receiving loose bulk material at the lower periphery of said wheel and for carrying such material upwardly during rotation of said wheel, a cover for the outside of said blade wheel, means for mounting said cover concentrically with said wheel and independently of the rotating movement thereof, said cover having openings for receiving and discharging said loose bulk material in loading and unloading, an inclined chute extending downwardly through said wheel and said cover toward the inside of said tank adapted to receive loose bulk material from said wheel and to convey said material into said tank, and means for fixedly mounting said chute on said cover.

9. Apparatus for loading and unloading vehicles for carrying loose bulk material comprising in combination a drum shaped tank substantially horizontally mounted on said vehicle and adapted to contain said material, said tank having an opening at one end thereof for receiving said material, a blade wheel at said open end of said tank, means for mounting said wheel for rotating movement substantially coaxially with said tank, means for rotating said tank and said wheel together about the common axis thereof, means in said wheel including a plurality of conveyor blades around the inner periphery of said wheel adapted to receive said material therebetween for carrying such material upwardly during rotation of said wheel, an inclined chute extending through said wheel into said tank for conveying loose bulk material from said wheel into said tank, anad means for swivelly mounting said chute within said wheel for adjustable movement about the axis of rotation thereof and independently of the rotating movement thereof.

10. Apparatus for loading and unloading vehicles for carrying loose bulk material comprising in combination a drum shaped tank substantially horizontally mounted on said vehicle and adapted for rotating movement about the longitudinal axis thereof, a plurality of inclined conveying guide plates within said tank, means for mounting said plates for subdividing the interior of said tank transversely into a plurality of compartments of substantially triangular cross-section, the height of said compartments being substantially equal to the interior diameter of said tank for distributing said loose bulk material through said tank as said material is advanced from one of said compartments to another by said conveying guide plates during rotation of said tank, said tank having an opening at one end thereof for receiving said material, a blade wheel including conveyor blades therein mounted substantially coaxially with said tank at said open end thereof, means for rotating said tank and said wheel together about the common axis thereof during both loading and unloading operations in a single direction opposed to the direction of advance of said material through said tank by said conveying guide plates, an inclined chute for conveying material into and out of said tank, and means for mounting said chute within said wheel independently of the rotating movement thereof.

11. Apparatus for loading and unloading vehicles for carrying loose bulk material comprising in combination a drum shaped tank, means for mounting said tank substantially horizontally on said vehicle for rotation about the longitudinal axis of said tank, said tank having an opening at one end thereof for receiving said bulk material, a blade wheel at said open end of said tank, means for mounting said wheel substantially coaxially with said tank for rotation therewith, means for rotating said tank and said wheel together about the common axis thereof, an inclined chute within said wheel extending downwardly from the outside of said wheel toward the inside of said tank for conveying loose bulk material dropped upon said chute by said wheel into said tank, said blade wheel comprising a hollow cylinder of a larger inside diameter than said tank opening, a plurality of radially directed conveyor blades disposed around the inner circumference of said cylinder and means for introducing loose bulk material into said wheel between said blades, said blades having portions formed for carrying such material introduced therebetween upwardly during rotation of said wheel and for discharging such material onto the upper portion of said inclined chute.

12. Apparatus for loading and unloading vehicles for carrying loose bulk material comprising in combination a drum shaped tank mounted substantially horizontally on said vehicle, said tank having an opening at one end thereof for receiving said bulk material, a wheel therein mounted substantially coaxially with said tank at said open end thereof, means for rotating said tank and said wheel together about the common axis thereof, conveyor blades within said wheel inwardly projecting toward the center thereof, the outer ends of said blades being affixed to said wheel at the periphery thereof, an inclined chute within said wheel extending into said open end of said tank, means outwardly of said tank for mounting said chute independently of the rotating movement of said wheel and stationary with respect thereto, said chute extending downwardly from the outside of said wheel toward the inside of said tank for guiding loose bulk material dropped upon said chute by said wheel downwardly into said tank.

ALBERT BLESSING.
GEORG STAUDENMEIER.
HANS TILCH.
FRITZ KAISER.

References Cited in the file of this patent

UNITED STATES PATENTS

| Number | Name | Date |
|---|---|---|
| 1,753,135 | Schuberth | Apr. 1, 1930 |
| 1,831,648 | Bauer et al. | Nov. 10, 1931 |
| 1,991,297 | Schluter | Feb. 12, 1935 |
| 2,000,631 | Windecker | May 7, 1935 |
| 2,436,959 | Ekin et al. | Mar. 2, 1948 |
| 2,507,275 | Shafer, Jr. | May 9, 1950 |

FOREIGN PATENTS

| Number | Country | Date |
|---|---|---|
| 745,144 | France | Feb. 7, 1933 |
| 46,002 | France | Dec. 3, 1935 |
| | (Addition to No. 790,709) | |
| 482,332 | Germany | Sept. 11, 1929 |